(12) United States Patent
Keimig

(10) Patent No.: US 9,682,665 B2
(45) Date of Patent: Jun. 20, 2017

(54) INTERIOR TRIM FOR A MOTOR VEHICLE AND MOTOR VEHICLE WITH SUCH AN INTERIOR TRIM

(71) Applicant: GM GLOBAL TECHNOLOGY OPERATIONS LLC, Detroit, MI (US)

(72) Inventor: Udo Keimig, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/972,748

(22) Filed: Dec. 17, 2015

(65) Prior Publication Data

US 2016/0176365 A1    Jun. 23, 2016

(30) Foreign Application Priority Data

Dec. 20, 2014 (DE) .................... 20 2014 010 108 U

(51) Int. Cl.
*B60R 13/02* (2006.01)
*B62D 33/027* (2006.01)

(52) U.S. Cl.
CPC .......... *B60R 13/0243* (2013.01); *B60R 13/02* (2013.01); *B62D 33/0273* (2013.01)

(58) Field of Classification Search
CPC .. B60R 13/0243; B60R 13/02; B62D 33/0273
USPC ..... 296/146.7, 50, 56, 57.1, 1.02, 1.08, 153, 296/1.09; 16/411, 430, 415
See application file for complete search history.

(56) References Cited

U.S. PATENT DOCUMENTS

| | | | |
|---|---|---|---|
| 5,868,455 A | * | 2/1999 | Springer ................. B29C 65/04 156/213 |
| 8,152,220 B2 | | 4/2012 | Fukui et al. |
| 2015/0231999 A1 | * | 8/2015 | Jadhav ................ B60R 13/0243 296/153 |

FOREIGN PATENT DOCUMENTS

| | | |
|---|---|---|
| DE | 102005045640 A1 | 3/2007 |
| DE | 102005042914 A1 | 4/2007 |
| DE | 102008034252 A1 | 1/2010 |
| DE | 102011017336 A1 | 10/2012 |
| JP | H09193665 A | 7/1997 |
| JP | H10244837 A | 9/1998 |
| JP | 2000355220 A | 12/2000 |

OTHER PUBLICATIONS

German Patent Office, German Search Report for German Application No. 202014010108.6, dated Nov. 12, 2015.

\* cited by examiner

*Primary Examiner* — Dennis H Pedder
(74) *Attorney, Agent, or Firm* — Lorenz & Kopf LLP

(57) ABSTRACT

An interior trim for a motor vehicle involves a plastic interior trim, which is made to face the vehicle interior. The interior trim exhibits a trim part, for example which can have a plate-shaped design, and a gripping part, which may have an essentially cup-, trough-, pot- or shell-shaped design. The gripping part is designed as a single piece with the trim part, yielding a gripping trough in the interior trim.

9 Claims, 1 Drawing Sheet

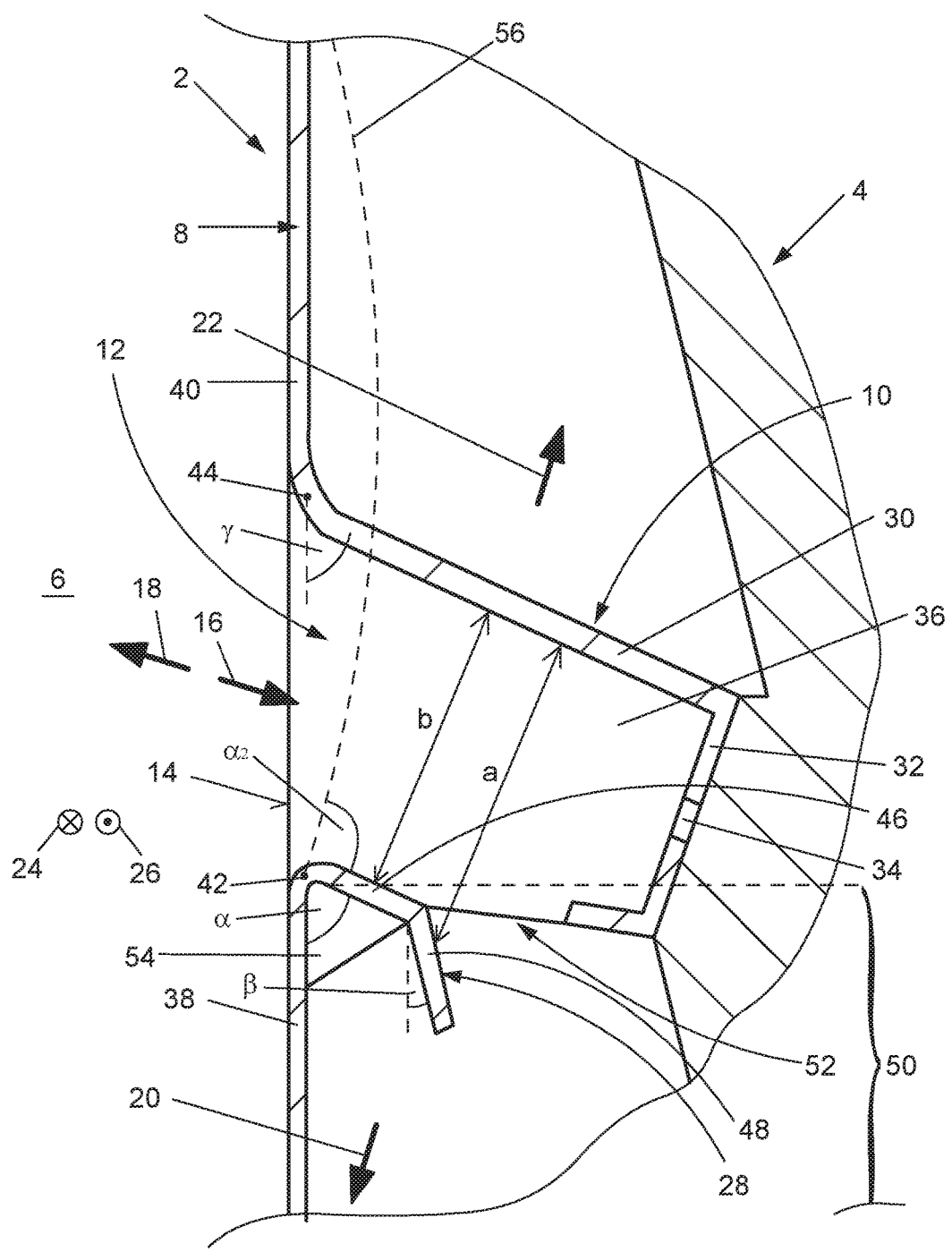

INTERIOR TRIM FOR A MOTOR VEHICLE AND MOTOR VEHICLE WITH SUCH AN INTERIOR TRIM

CROSS-REFERENCE TO RELATED APPLICATION

This application claims priority to German Patent Application No. 202014010108,6, filed Dec. 20, 2014, which is incorporated herein by reference in its entirety.

TECHNICAL FIELD

The present disclosure pertains to interior trims for motor vehicles, with a trim part and a gripping part, wherein the gripping part is designed as a single piece with the cladding part, yielding a gripping trough in the interior trim.

BACKGROUND

Known from practice are interior trims for motor vehicles that are designed as plastic parts or injection-molded plastic parts. As a rule, the latter consist of a trim part and a gripping part, wherein the gripping part is joined with the trim part, yielding a gripping trough in the interior trim. Known in particular are interior trims in which the trim part and gripping part are initially designed separately from each other, wherein the gripping part, for example which can be trough-shaped or cup-shaped in design, and is intended to yield a handle, was subsequently fastened to the trim part. The advantage to this embodiment variant is that the initially separate gripping part can be relatively flexibly dimensioned within the framework of production in an injection molding process, without the dimensioning or formation of the separate trim part posing any limitation. However, the disadvantage is that the production expenses are increased due to the two- or multi-piece design of the interior trim.

By contrast, there are interior trims for motor vehicles in which the trim part and gripping part are designed as a single piece with each other, so as to reduce the production expenses while manufacturing the interior trim in an injection molding process. However, the disadvantage associated with the trim part and gripping part consisting of a single piece is that the shape and dimensions of the trim part must always be considered while shaping and dimensioning the gripping part, so the simultaneous fabrication of the trim part within the framework of an injection molding process poses a limitation when shaping and dimensioning the gripping part. In known interior trims, in which the trim part and gripping part are designed as a single piece with each other, the gripping parts are designed in such a way that the gripping trough tapers in the gripping direction, so as to avoid undercuts, which cannot be achieved in an injection molding process, or only at an elevated outlay. This tapering of the gripping trough in the gripping direction is also associated with the disadvantage that the fingers of an operator reaching into the gripping trough have a limited freedom of motion, which makes the gripping part more difficult to handle and use, in particular in the case of long fingernails.

Therefore, embodiments of the present innovation provide an interior trim for a motor vehicle, in particular for a vehicle flap, vehicle door or tailgate of the motor vehicle, with a trim part and a gripping part designed as a single piece with the trim part, which makes the interior trim easy to handle in the installed state and relatively easy to manufacture. Accordingly, provided is a motor vehicle with such an advantageous interior trim.

SUMMARY

An embodiment of the innovation relates to an interior trim for a motor vehicle. The interior trim preferably involves a plastic interior trim, which must be made to face the vehicle interior. The interior trim exhibits a trim part, for example which can have a plate-shaped design, and a gripping part, which preferably has an essentially cup-, trough-, pot- or shell-shaped design. The gripping part is designed as a single piece with the trim part, yielding a gripping trough in the interior trim. In other words, the trim part and gripping part are not initially formed separately from each other, so as to subsequently fasten them together; rather, the trim part and gripping part are already fabricated as a single piece with each other, preferably within the framework of a plastic injection molding process. For example, the gripping trough itself can be designed as a holding part, which the vehicle passenger can hold on to during a drive. Likewise, the gripping trough, for example in the case of an interior trim arranged on a vehicle door or tailgate, can serve as an actuating means, so as to be able to grip the vehicle door or tailgate and move it into the respective position. The trim part exhibits a first trim part section, which is preferably guided to the edge of a gripping trough opening. The gripping part further exhibits a first boundary wall that follows the first trim part section. For example, this first boundary wall can border the gripping trough in one of the vertical directions or in one of the width directions of the gripping trough. The first boundary wall is at least partially angled relative to the first trim part section in such a way that the first trim part section can be gripped from behind via the gripping trough. This ensures that an operator can reliably hold on to the gripping part that serves as a holding part, or especially reliably grab and actuate the gripping part designed as an actuating part. In order to increase the freedom of movement for fingers reaching into the gripping trough in the gripping direction while inside of the gripping trough, and thus make the gripping part easier to handle, a recess that follows the first boundary wall in the gripping direction is provided in the gripping part, with which the expansion of the gripping trough in a vertical or width direction is enlarged in the area of the recess. As a result, the fingers of the operator reaching into the gripping trough can reach into the recess, thereby ensuring both freedom of movement for the fingers and ease of handling.

In a preferred embodiment of the interior trim according to the innovation, the first boundary wall is at least partially angled relative to the first trim part section in such a way that a distance in the vertical or width direction between the first boundary wall and an opposing second boundary wall of the gripping part in the vertical or width direction increases in the area of the first boundary wall in the gripping direction. The above must here not apply to all boundary wall sections of the first boundary wall, as will be explained once again below. In any event, increasing the mentioned distance yields a gripping trough that becomes larger or more voluminous in the gripping direction, ensuring that the operator or his or her fingers have an even greater absence of play, which simplifies handling even more, wherein the aforementioned recess enables an undercut into the gripping part without hampering production or even making it impossible.

In this way, for example, such an interior trim can be generated within the framework of a plastic injection molding process, in which two molded parts or sliders are used, which can adjoin each other in the area of the recess.

Alternatively or additionally to the embodiment described above, another preferred embodiment of the interior trim according to the innovation provides that the distance between the first boundary wall and an opposing second boundary wall of the gripping part in the vertical or width direction remain constant in the area of the first boundary wall in the gripping direction. In other words, the gripping trough at the very least does not taper in this area. As also holds true for this embodiment, the above need not apply to all boundary wall sections of the first boundary wall, as will be explained in even greater detail later.

In another embodiment of the interior trim according to the innovation, the boundary wall exhibits a front boundary wall section and a rear boundary wall section that follows the front boundary wall section and is angled relative to the front boundary wall section. It was shown that designing the first boundary wall in this way makes manufacturing the interior trim especially easy. In addition, it allows the operator to reach into the gripping trough in an especially ergonomic manner.

In an advantageous embodiment of the interior trim according to the innovation, the distance in the vertical or width direction between the rear boundary wall section and the opposing second boundary wall in the vertical or width direction increases in the area of the rear boundary wall section in the gripping direction.

In order to further simplify production of the interior trim within the framework of an injection molding process, the rear boundary wall section of the first boundary wall in another advantageous embodiment of the interior trim according to the innovation includes an angle of between 0° and 25°, preferably of between 5° and 20°, with the first trim part section. In addition, this alignment of the rear boundary wall section of the first boundary wall makes handling easy and comfortable.

The front boundary wall section of the first boundary wall could basically be designed like the rear boundary wall section in one of the ways described above. However, in another advantageous embodiment of the interior trim according to the innovation, the distance between the front boundary wall section and the opposing second boundary wall of the gripping part in the vertical or width direction is designed to remain constant in the area of the front boundary wall section in the gripping direction, so as to keep production simple and make the gripping part comfortable to handle by the operator.

In order to achieve an elevated stability for the gripping part when reaching into the latter and exerting a force on the latter, another preferred embodiment of the interior trim according to the innovation provides that at least one supporting rib be arranged between the first boundary wall and first trim part section, with which the first boundary wall can be or is supported on the trim part section. It has here proven advantageous for the at least one supporting rib to be designed as a single piece with the interior trim, so as to achieve an especially high stability and simplicity of manufacturing the interior trim, so that the at least one supporting rib can be generated in conjunction with the trim part and gripping part as a single piece, for example within the framework of a plastic injection molding process.

In another preferred embodiment of the interior trim according to the innovation, the at least one supporting rib is arranged between the front boundary wall section and the first trim part section. It is here preferred that the supporting rib extend up to the transition point between the front boundary wall section and first trim part section.

The at least one supporting rib between the front boundary wall section and first trim part section could basically also extend between the rear boundary wall section and first trim part section. However, in order to economize on material here without notably weakening the stability of the gripping part, the at least one supporting rib in another advantageous embodiment of the interior trim according to the innovation is arranged or designed in such a way as to end before or at the rear boundary wall section, and thus not be completely arranged between the rear boundary wall section and first trim part section.

In another advantageous embodiment of the interior trim according to the innovation, the first boundary wall forms a lower or upper boundary wall, and the second boundary wall forms an upper or lower boundary wall of the gripping part inside of the motor vehicle in the installed state of the interior trim. It is here preferred for the interior trim of a tailgate that the first boundary wall form a lower boundary wall on the tailgate, and the second boundary wall form an upper boundary wall of the gripping part in the installed state, so as to make the tailgate especially easy to handle within the framework of closing the latter.

In another embodiment of the interior trim according to the innovation, the gripping part exhibits a floor wall that borders the gripping trough in the gripping direction. It is here preferred that the interior trim can be supported or fastened on the driver side via the floor wall, so as to ensure a reliable support and/or fastening of the interior trim on the vehicle, for example the tailgate. To this end, the floor wall may incorporate a fastening hole, through which a fastener, for example a screw shank, a clip or the like, can be or is passed.

As already alluded to above, the interior trim is in another advantageous embodiment of the latter designed as a plastic part or as a plastic injection molded part. It is here preferred that the interior trim be made out of polypropylene or polyethylene.

An embodiment of the motor vehicle according to the innovation relates to a motor vehicle with an interior trim of the kind according to the innovation that faces the vehicle interior.

In an advantageous embodiment of the motor vehicle according to the innovation, the interior trim is arranged on a vehicle flap or vehicle door, preferably on a tailgate, of the motor vehicle. In the latter case, the interior trim could be arranged or fastened on the side of the tailgate facing the luggage compartment.

In another preferred embodiment of the motor vehicle according to the innovation, the tailgate can be pivoted around a pivoting axis from an open position into a closed position and vice versa in such a way that a point of the interior trim, for example a transition point between the first trim part section and first boundary wall, is moved along a pivoting path when the tailgate is pivoted. The pivoting path is here designed in such away that the first boundary wall, preferably its front boundary wall section, includes an angle with the pivoting path on its side facing the gripping trough that measures at least 90°, preferably more than 90°, to make it especially easy for the tailgate to pivot back from the open position into the closed position assisted by the hand of the operator reaching into the gripping trough.

BRIEF DESCRIPTION OF THE DRAWINGS

The present invention will hereinafter be described in conjunction with the drawing FIGURE, which shows a partial side view of an embodiment of the interior trim in an installed state on a tailgate of the motor vehicle, in a sectional representation.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The sole FIGURE shows an embodiment of the interior trim 2 according to the innovation in an installed state, in which the interior trim 2 is fastened to a tailgate 4, wherein the interior trim 2 is fastened on the side of the tailgate 4 facing the vehicle interior 6, for example the luggage compartment. In addition, let it be noted that the interior trim 2, even if not depicted, can be arranged or fastened on another vehicle flap or vehicle door, wherein it is likewise possible to arrange or fasten the interior trim 2 on a component of the motor vehicle that is not movable, as opposed to a vehicle flap, vehicle door or tailgate. On the FIGURE, the tailgate 4 is in its closed position, in which the tailgate 4 along with the interior trim 2 covers the vehicle interior 6, here the luggage compartment. Between the depicted closed position and an open position, in which the tailgate 4 releases the vehicle interior 6 to the outside, the tailgate 4 can nonetheless be pivoted around a pivoting axis which, while not shown on the FIGURE, runs along a normal on the drawing plane, and in the drawing plane is arranged above the cutout of the tailgate 4 depicted on the FIGURE.

The interior trim 2 exhibits a trim part 8, which essentially serves to cover the side of the tailgate 4 facing the vehicle interior 6, and a gripping part 10, which is essentially cup-, trough-, pot- or shell-shaped in design, wherein the precise design of the gripping part 10 will be discussed in greater detail again later. The gripping part 10 is designed as a single piece with the trim part 8, yielding a gripping trough 12 in the interior trim 2. The gripping trough 12 here exhibits a gripping trough opening 14 that faces the vehicle interior 6, which essentially is arranged in one plane with the side of the trim part 8 facing the vehicle interior 6.

An operator can reach into the gripping trough 12 via the gripping trough opening 14 in a gripping direction 16 shown on the FIGURE, wherein the direction 18 opposite the gripping direction 16 is also denoted by a corresponding arrow. In addition, the opposing vertical directions 20, 22 and the opposing width directions 24, 26 of the gripping trough 12 or gripping part 10 are also denoted on the FIGURE by corresponding arrows. The mentioned directions 16 to 26 yield an orthogonal system for the gripping trough 12 or gripping part 10.

The gripping trough 12 is bordered in the vertical direction 20 by a first boundary wall 28, and in the vertical direction 22 by a second boundary wall 30. The gripping trough 12 is further bordered in the gripping direction 16 by a floor wall 32. As evident from the FIGURE, the interior trim 2 is supported and fastened via the floor wall 32 on the vehicle side, here on the side of the tailgate 4 facing the vehicle interior. To this end, the floor wall 32 incorporates a fastening hole 34, through which a fastener not shown in any greater detail, for example a screw, a screw shank or a clip, can be passed in the gripping direction 16 or in the direction 18 opposite the gripping direction 16, so as to bring about the attachment to the tailgate 4. In addition, the gripping trough 12 is bordered in the width direction 24 by a lateral wall 36, and in the width direction 26 by an additional lateral wall, which essentially corresponds to the lateral wall 36, wherein the additional lateral wall is not shown on the FIGURE due to the sectional view. In the installed state of the interior trim 2 depicted here, the first boundary wall 28 forms a lower boundary wall, while the second boundary wall 30 forms an upper boundary wall of the gripping part 10. The interior trim 2 is designed as a plastic part or as a plastic injection molded part, wherein the interior trim 2 is preferably made out of polypropylene or polyethylene.

The trim part 8 exhibits a first trim part section 38 and a second trim part section 40, wherein the first trim part section 38 passes over into the first boundary wall 28 via a transition point 42, so that the first boundary wall 28 logically follows the first trim part section 38. By contrast, the second trim part section 40 passes over into the second boundary wall 30 via a transition point 44, so that the second boundary wall 30 logically follows the second trim part section 40. In the area of the transition points 42, 44, the interior trim 2 is respectively curved or bent, so as to reduce the risk of injury in the area of the gripping trough opening 14. The same can hold true for the transition points between the lateral wall 36 and additional lateral wall on the one hand and the trim part 8 on the other.

The first boundary wall 28 exhibits a front boundary wall section 46 and a rear boundary wall section 48 that adjoins on the side of the front boundary wall section 46 facing away from the first trim part section 38, which thus logically follows the front boundary wall section 46 in the gripping direction 16. The first boundary wall 28 is angled relative to the first trim part section 38 as depicted by the angle $\alpha$ on the FIGURE in such a way that the first trim part section 38 can be gripped from behind via the gripping trough 12 in the section 50.

The gripping part 10 further incorporates a recess 52, which follows the first boundary wall 28 in the gripping direction 16. This recess 52 can here also be a recess inside of the lower boundary wall or first boundary wall 28, as may be gleaned from the FIGURE. The recess 52 serves to enlarge the expansion of the gripping trough 12 in the vertical direction 20, thereby providing a greater play for the fingers on the hand of an operator that are reaching into the gripping trough 12 in the gripping direction 16.

The rear boundary wall section 48 is angled relative to the front boundary wall section 46 of the first boundary wall 28, as denoted by the angle $\beta$. The angle $\beta$ is here smaller than the angle $\alpha$, and the angle $\beta$ describes the angle included by the rear boundary wall section 48 and the first trim part section 38. This angle $\beta$ preferably measures between 0° and 25°, especially preferably between 5° and 20°, so as to simplify production within the framework of a plastic injection molding process on the one hand, and impart a greater play to the fingers of the operator on the other. In each case, the angle $\beta$ is selected in such a way that the distance a in the vertical direction 20, 22 between the rear boundary wall section 48 and the opposing second boundary wall 30 in the vertical direction 20, 22 is increased in the area of the rear boundary wall section 48 in the gripping direction 16. By contrast, a distance b in the vertical direction 20, 22 between the front boundary wall section 46 and the opposing second boundary wall 30 of the gripping part 10 in the vertical direction 20, 22 is held constant in the area of the front boundary wall section 46 in the gripping direction 16. In the latter case, it could also be said that the angle α corresponds to an angle γ in which the second boundary wall 30 is slanted relative to the second trim part section 40.

As evident from the FIGURE, at least one supporting rib 54 is arranged between the first boundary wall 28 and the first trim part section 38, with which the first boundary wall 28 can be or is supported on the first trim part section 38. The at least one supporting rib 54 here preferably extends in a plane spanned by the gripping direction 16 and direction 18 on the one hand and the vertical directions 20, 22 on the other, wherein, given several supporting ribs 54, the latter are preferably arranged sequentially in the width direction 24, 25 and spaced apart from each other. The at least one supporting rib 54 is here also designed as a single piece with the interior trim 2, so that the at least one supporting rib 54 is already generated within the framework of manufacturing the interior trim 2, preferably within the framework of a plastic injection molding process. As further evident from the FIGURE, the at least one supporting rib 54 is arranged between the front boundary wall section 46 and the first trim part section 38, wherein the at least one supporting rib 54 preferably ends before, as shown on the FIGURE, or at the rear boundary wall section 48.

As already alluded to previously, the tailgate 4 along with the interior trim 2 can be pivoted around a pivoting axis (not shown in any more detail) between an open position and a closed position. When pivoting the depicted tailgate 4, a point of the interior trim 2, e.g., the transition point 42 between the first trim part section 38 and the first boundary wall 28 in this case, can move along a pivoting path 56 denoted on the FIGURE. In this case, the arrangement of the interior trim 2 on the tailgate 4 and positioning of the pivoting axis are selected in such a way that the first boundary wall 28, preferably the front boundary wall section 46 as depicted here, includes an angle $\alpha_2$ on its side facing the gripping trough 12 with the pivoting path 56 that measures at least 90°, preferably more than 90°.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An interior trim for a motor vehicle comprising:
a trim part having a first trim part section, a second trim part section and a gripping part, the trim part configured as a single piece;
wherein the gripping part includes a front boundary wall extending from the first trim part section to define an first included angle (α) therebetween, a rear boundary wall extending from the front boundary wall to define a second angle (β) relative to the first trim part section, a second boundary wall extending from the second trim part section, a floor wall extending from the second boundary wall to define a gripping trough between the first and second trim part sections, and an opening opposite the second boundary wall between the front boundary wall and the floor wall.

2. The interior trim according to claim 1, wherein the angle α and angle β relative to the first trim part section are such that a distance (a) between the rear boundary wall and the second boundary wall of the gripping part increases in a gripping direction from a surface of the trim part towards the floor wall, and a distance (b) between the front boundary wall and the second boundary wall of the gripping part remains constant in the gripping direction.

3. The interior trim according claim 1, wherein the angle β is between 0° and 25°, with the first trim part section.

4. The interior trim according to claim 1, wherein at least one supporting rib is arranged between the front boundary wall and first trim part section wherein the front boundary wall is supported on the first trim part section and the at least one supporting rib is designed as a single piece with the interior trim.

5. The interior trim according to claim 4, wherein the at least one supporting rib ends before or at the rear boundary wall section.

6. The interior trim according to claim 1, wherein the floor wall has a fastening hole through which a fastener can be passed.

7. The interior trim according to claim 1, wherein the interior trim is a plastic part made out of one of polypropylene and polyethylene.

8. A motor vehicle with an interior trim facing the vehicle interior according to claim 1, wherein the interior trim is disposed on one of a vehicle flap, a vehicle door and a tailgate.

9. The motor vehicle according to claim 8, wherein the tailgate can pivot around a pivoting axis between an open position and a closed position in such a way that a point of the interior trim can be moved along a pivoting path, wherein the front boundary wall includes an angle ($\alpha_2$) with the pivoting path on its side facing the gripping trough that measures at least 90°.

* * * * *